United States Patent [19]
Kubota

[11] 4,319,456
[45] Mar. 16, 1982

[54] TANDEM MASTER CYLINDER WITH A LIQUID PRESSURE CONTROL VALVE

[75] Inventor: Hitoshi Kubota, Fujisawa, Japan

[73] Assignee: Nissan Motor Co., Ltd., Yokohama, Japan

[21] Appl. No.: 121,151

[22] Filed: Feb. 13, 1980

[30] Foreign Application Priority Data

Feb. 14, 1979 [JP] Japan .................................. 54-15016

[51] Int. Cl.³ .......................................... B60T 11/20
[52] U.S. Cl. ...................................... 60/562; 60/591
[58] Field of Search ........................ 60/561, 591, 562; 303/6 C

[56] References Cited

U.S. PATENT DOCUMENTS 3,686,864  8/1972  Shutt ..................................... 60/561
4,253,306  3/1981  Kuroki .................................. 60/562

FOREIGN PATENT DOCUMENTS 2253654  7/1975  France ................................. 60/591
1358678  7/1974  United Kingdom .
1417023  12/1975  United Kingdom .
1435854  5/1976  United Kingdom .

*Primary Examiner*—Abraham Hershkovitz
*Attorney, Agent, or Firm*—Schwartz, Jeffery, Schwaab, Mack, Blumenthal & Koch

[57] ABSTRACT

A tandem master cylinder comprising a primary piston and a secondary piston disposed in tandem within one cylinder body for producing brake pressures for front and rear wheels in response to depression of a brake pedal, respectively. A liquid pressure control valve is disposed in the cylinder body and adapted to normally suppress the rise of the rear wheel brake pressure and to remove such suppression of the rear wheel brake pressure upon occurrence of a failure in a front wheel brake system.

1 Claim, 4 Drawing Figures

TANDEM MASTER CYLINDER WITH A LIQUID PRESSURE CONTROL VALVE

BACKGROUND OF THE INVENTION

1. Field of the Invention

This invention relates to a tandem master cylinder, and more particularly to a tandem master cylinder with a liquid pressure control valve (proportioning valve) integrally constructed therein for preventing automobile rear wheels being locked early.

2. Description of the Prior Art

An automobile brake device with two separate liquid pressure brake systems for ensuring safety at a brake failure or trouble is often used these days as a safety means. When brake action is applied to an automobile, load distribution between front wheels and rear wheels is changed, so that the rear wheel load becomes much smaller than the front wheel load. Thus, if the liquid pressure for braking applied to the rear wheels is the same as that applied to the front wheels, the rear wheels tend to be locked before the front wheels for causing rear wheel skidding or the so-called "rear-end swaying" which is highly dangerous. Accordingly, most of the aforesaid two-system safe brake devices are provided with such a liquid pressure control valve disposed in rear wheel brake systems thereof, which valve restricts the rear wheel brake liquid pressure from rising in excess of a certain liquid pressure level. The liquid pressure control valve to be disposed in the rear wheel brake system has shortcomings in that space for mounting such valve is difficult to secure, that number of parts forming the brake system tends to become too large, and that piping workability is considerably deteriorated.

SUMMARY OF THE INVENTION

The present invention obviates the aforesaid shortcomings of the prior art techniques by incorporating a liquid pressure control valve (proportioning valve) in a tandem master cylinder of a two-system safe brake device, which valve not only prevents an excessive rise of rear wheel brake liquid pressure but also ensures adequate rear wheel brake liquid pressure in case of failure in or loss of a front wheel brake system, i.e., the aforesaid valve eliminates a risk of insufficient brake force during failure of the front wheel brake system caused by the suppression of the rear wheel brake pressure under normal conditions. More particularly, with a tandem master cylinder having a liquid pressure control valve according to the present invention, the liquid pressure control valve is continuously opened during a loss of the front wheel brake system by using an excessively large stroke of a piston in the cylinder caused by said loss, whereby the liquid pressure controlling function of the liquid pressure control valve is substantially nullified as long as the loss lasts.

BRIEF DESCRIPTION OF THE DRAWING

For a better understanding of the invention, reference is made to the accompanying drawing, in which.

DESCRIPTION OF THE PREFERRED EMBODIMENTS

Figure 1:
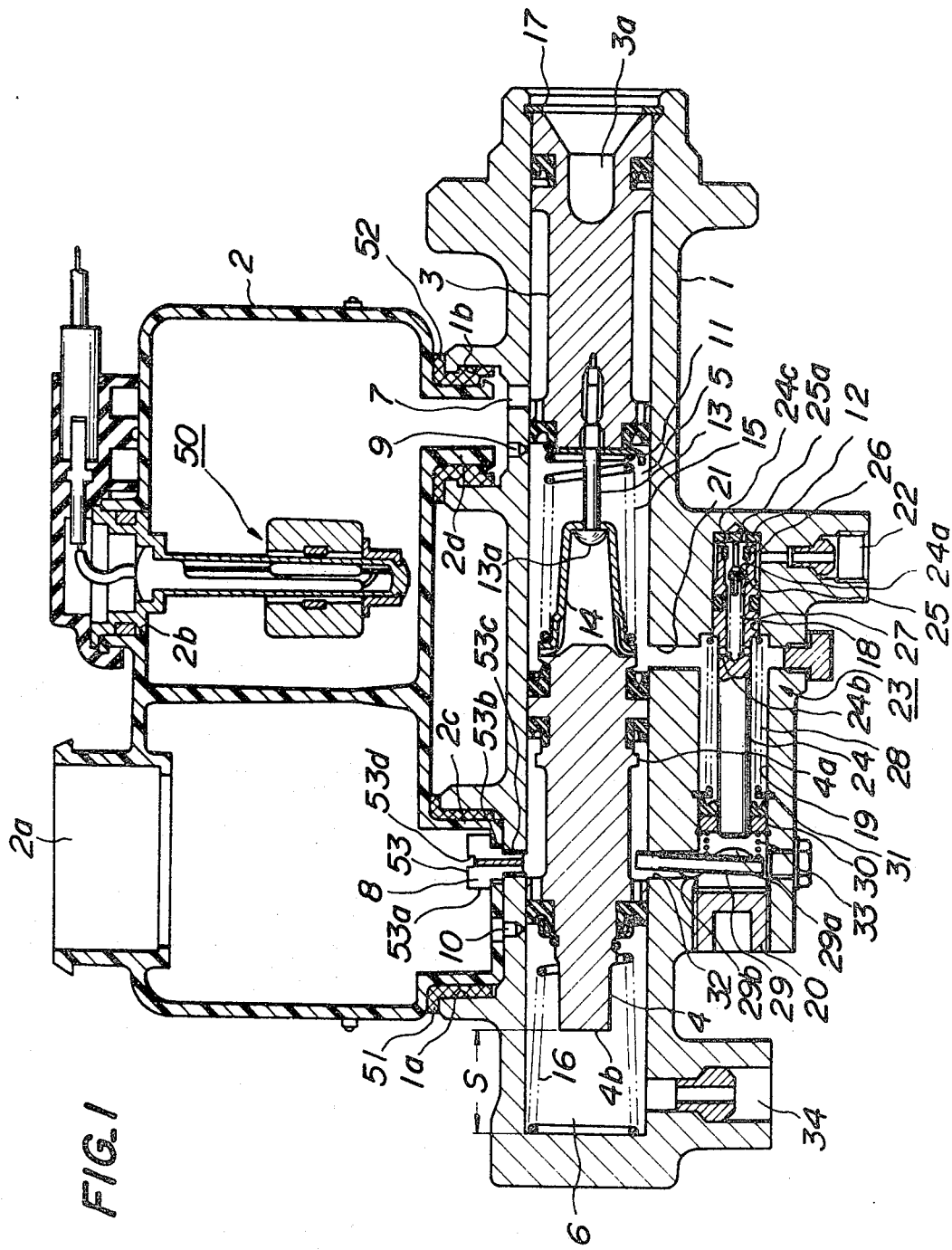
FIG. 1 is a longitudinal sectional view of a tandem master cylinder with a liquid pressure control valve according to the present invention.
Figure 2:
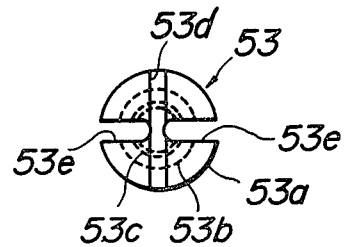
FIG. 2 is a schematic plan view of a bolt for mounting a reservoir onto a cylinder body of FIG. 1.

Referring to FIG. 1 illustrating construction of an embodiment of the tandem master cylinder with a liquid pressure control valve according to the present invention, a cylinder body 1 has a reservoir 2 secured thereto for holding a brake liquid. The reservoir 2 has top openings 2a and 2b for pouring the brake liquid therethrough and boss portions 2c and 2d formed at the bottom thereof, which boss portions have openings bored therethrough for discharging the brake liquid. One of the top openings 2b for pouring the brake liquid is provided with a liquid level detector 50, which detector also functions as a closing cover of the opening. The reservoir 2 is fixed to the cylinder body 1 by bolts 53 and by fitting the boss portions 2c and 2d at the bottom thereof onto embossed portions 1a and 1b of the cylinder body 1 while inserting grommets 51 and 52 therebetween, respectively. As clearly shown in FIG. 2, the bolt 53 has a head 53a, a shoulder portion 53b with a reduced diameter, and a male thread portion 53c with a further reduced diameter, and the head 53a has a driver groove 53d bored on top surface thereof. In fixing the reservoir 2 onto the cylinder body 1, the male thread portion 53c is screwed through a wall of the body 1, by using the driver groove 53d.

A primary piston 3 and a secondary piston 4 are slidably fitted in the inside of the cylinder body 1, so as to define chambers 5 and 6 therein. A supply port 7 for supplying the brake liquid into the chamber 5 through the inside of the boss portion 2d and a relief port 9 are formed on the cylinder body 1. As apparent from FIG. 2, a slit 53e is formed through the bolt 53 so as to extend the entire length of the bolt. This slit 53e is used to form another supply port 8 shown in FIG. 1, which supply port 8 is used together with a relief port 10 formed on the cylinder body 1 for supplying the brake liquid in the reservoir 2 into the chamber 6 through the inside of the boss portion 2c.

A spring seat 11 is attached to the inside end surface of the primary piston 3, and a bolt 13 is planted on that end of the piston 3 so as to hold a compressed spring 15 between this spring seat 11 and another spring seat 14 screwed to the bolt 13. The spring 15 urges the spring seat 14 away from the primary piston 3, and the displacement of the spring seat 14 away from the piston 3 is restricted by a head 13a of the bolt 13. Another spring 16 acts on that end surface of the secondary piston 4 which is farthest from the primary piston 3, so as to cause the piston 4 to come in contact with the spring seat 14 and also to cause the primary piston 3, through the actions of the spring seat 14 and the spring 15, to engage a snap ring 17 provided at an end opening of the cylinder body 1.

With the present invention, a stepped blind hole is bored in the cylinder body 1, which hole has a small-diameter plunger hole 18 and a large-diameter plunger hole 19 communicating with each other, and that end opening of the large-diameter plunger hole 19 which is farthest from the small-diameter plunger hole 18 is sealed by a plug 20 in a liquid-tight manner. The cylinder body 1 further includes a communicating hole 21 extending from the chamber 5 to the large-diameter plunger hole 19 and a port 22 for connection to rear wheel brake cylinders, which port 22 has an opening facing the small-diameter plunger hole 18 in the proximity of the bottom of the small-diameter plunger hole 18. A passage for extracting the rear wheel brake liquid pressure is formed of the communicating hole 21, the plunger holes 18 and 19, and the port 22.

According to the present invention, a liquid pressure control valve 23, which is sometimes called as a proportioning valve, is inserted in the aforesaid passage for extracting the rear wheel brake liquid pressure. The liquid pressure control valve 23 includes, for instance, a plunger 24 slidably fitted in the small-diameter plunger hole 18, which plunger 24 has a blind hole 24a wherein a poppet valve body 25 is disposed, and a hollow valve seat 26 is mounted on the open end of the blind hole 24a. A spring 27 urges the poppet valve body 25 to a closing direction thereof. The valve body 15 has a valve rod 25a secured thereto so as to extend in the longitudinal axial direction of the plunger 24, with an end of the valve rod 45a loosely penetrating through the central hole of the hollow valve seat 26, and the thus penetrating portion of the valve rod 25a is long enough to project out of the open end of the blind hole 24a when the valve body 25 is at a closed position thereof. The plunger 24 is guided by a retainer 30 disposed in the plunger hole 19, and a spring 28 seating on a snap ring 31 secured to the inside of the plunger hole 19 urges the plunger 24 so as to cause the plunger 24 engage a seat plate 12 fitted at the bottom of the plunger hole 18, and with the plunger 24 at this position, the valve rod 25a abuts the seat plate 12 and keeps the valve body 25 at an open position thereof against the elasticity of the spring 27.

The plunger 24 has a lateral hole 24b communicating with the blind hole 24a thereof and at least one slit 24c formed at the open end of the blind hole 24a for communicating the inside of the blind hole to the outside thereof, so that with the poppet valve body 25 at the open position thereof, the communicating hole 21 is communicated with the port 22 through a passage as will be described hereinafter.

A radial hole 32 is bored in the cylinder body 1, so as to extend from a position of the plunger hole 19 between the plug 20 and the retainer 30 to that hole of the cylinder body 1 which receives the secondary piston 4. A valve-opening rod 29 is fitted in the radial hole 32. A semi-spherical projection 29a is attached to one end of the valve-opening rod 29, so that the projection 29a faces the end surface of the plunger 24, and another projection 29b is attached to the opposite surface of the valve-opening rod 29 to the spherical projection 29a at an intermediate point between opposing ends of the rod 29, which projection 29b is so disposed as to come in contact with the inner surface of the radial hole 32. A compressed spring 33 is inserted between that end of the valve-opening rod 29 which carries the semi-spherical projection 29a and the retainer 30, so that the valve-opening rod 29 is resiliently held in a swingable manner with the semi-spherical projection 29a separated from the corresponding end surface of the plunger 24, as shown in FIG. 1. That end of the spring 33 which is farthest from the retainer 30 engages the maximum diameter portion of the semi-spherical projection 29a on one surface of the rod 29, so that the position of the valve-opening rod 29 in the longitudinal direction thereof is fixed by the spring 33. Being at this position, the opposite end of the valve-opening rod 29 projects into the piston-receiving hole of the cylinder body 1 by a sufficient distance for allowing an annular projection 4a of the secondary piston 4 to engage the thus extended end of the valve-opening rod 29.

It is noted that, when the valve-opening rod 29 is urged by the spring 33 in a clockwise direction about the projection 29b as seen in FIG. 1, the rotation is limited by the engagement of the valve-opening rod 29 with the opening edge of the radial hole 32, so that the rotating position of the valve-opening rod 29 is determined by the magnitude of the radial hole 32. Under such conditions, the spacing from the plunger 24 to the semi-spherical projection 29a is such that, when the plunger 24 moves leftward in FIG. 1, the aforesaid spacing exists unless the valve seat 26 engages the valve body 25. More particularly, the size of the radial hole 32 is so determined as to avoid any disturbance of the regular liquid pressure control function of the liquid pressure control valve 23 or the proportioning valve by the spacing between the plunger 24 and the semi-spherical projection 29a. Besides, the annular projection 4a is so positioned that the annular projection 4a does not engage the aforesaid extended end of the valve-opening rod 29 during the normal stroke of the secondary piston 4 necessary for normal operation of the tandem master cylinder.

The tandem master cylinder of the present invention with the aforesaid construction is connected to rear wheel cylinders through the port 22 thereof and to front wheel cylinders through a port 34 formed on the cylinder body 1 so as to communicate with the chamber 6 while an outer end recess 3a of the primary piston 3 abuttingly receives a push rod (not shown) operatively related to a brake pedal (not shown).

The operation of the tandem master cylinder of the present invention is as follows.

FIG. 1 shows the unoperated conditions of the tandem master cylinder with the liquid pressure control valve according to the present invention. Under such conditions, if a brake pedal (not shown) is depressed, the depressing force acts to push the primary piston 3 to the left, as seen in FIG. 1, through a push rod (not shown). At this moment, the secondary piston 4 is also pushed in the same direction as the primary piston 3, through the valve seat 11, the spring 15, and the spring seat 14. As a result, liquid pressures are produced in the chambers 5 and 6, and the liquid pressure in the chamber 6 is delivered to front wheel cylinders through the port 34, while the liquid pressure in the chamber 5 is delivered to the rear wheel cylinders through the communicating hole 21, the lateral hole 24b, the blind hole 24a, the slit 24c, and the port 22. Accordingly, the brake liquid pressures for the front wheels and the rear wheels are the same, as shown by a line a-b of FIG. 4, and such liquid pressure increases in response to an increase in the depressing force on the brake pedal (not shown).

Figure 4:
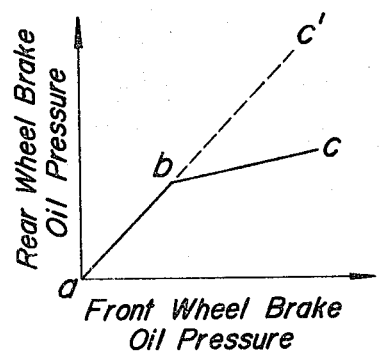
FIG. 4 is a graph showing operating characteristics of the tandem master cylinder of the present invention in distributing liquid pressure to front and rear wheel brake systems.

When the aforesaid brake pedal depressing force increases to a value causing the liquid pressures from the ports 22 and 34 to reach a split point b of FIG. 4, the plunger 24 moves to the left against the elasticity of the spring 28, as seen in FIG. 1, due to the difference in pressure receiving areas between the opposite ends thereof, causing the valve seat 26 to come into closing engagement with the valve body 25. As a result, the valve body 25 interrupts the aforesaid liquid pressure passage from the chamber 5 to the port 22, so that the direct delivery of the liquid pressure in the chamber 5 of the master cylinder to the rear wheel cylinders is interrupted. When the brake pedal depressing force further increases, the master cylinder liquid pressure at the chamber 5 increases accordingly, and the plunger 24 is moved in a reverse direction due to an increment of the liquid pressure caused by the increased master cylinder liquid pressure. Thereby, the valve body 25 opens the aforesaid passage again. Through the repetition of the aforesaid actions, after the split point b of FIG. 4, the rear wheel brake liquid pressure from the port 22 increases while being restricted in the same manner as a restriction by a regular proportioning valve. On the other hand, the front wheel brake liquid pressure from the port 34 is the same as the master cylinder liquid pressure corresponding to the brake pedal depressing force, so that the distribution of the front and rear wheel brake liquid pressures after the split point b becomes as shown by a line b–c of FIG. 4. As a result, the rear wheel skidding can be prevented.

Meanwhile, if the front wheel brake system fails, the brake pedal depressing force applied to the tandem master cylinder does not produce any active liquid pressure in the chamber 6, so that the secondary piston 4 is urged by the primary piston 3 through the spring 15 so as to move together with the primary piston 3 until the forward end 4b of the secondary piston 4 strikes the bottom end of the inside surface of the cylinder body 1. After a stroke s upto the aforesaid striking by the forward end 4a, if the primary piston 3 moves further to the left as seen in FIG. 1, a liquid pressure is generated in the chamber 5. During such a loss stroke, the annular projection 4a engages the top or extended end of the valve-opening rod 29 for moving the top end to the left. Thereby, the valve-opening rod 29 swings about the projection 29b in a counter-clockwise direction as seen in FIG. 1, so that the semi-spherical projection 29a urges the plunger 24 to the right as seen in the figure. Whereby, the aforesaid leftward travel of the plunger 24 is prohibited, and the valve seat 26 cannot come into contact with the valve body 25, and the port 22 is continuously communicated with the chamber 5. Accordingly, the master cylinder liquid pressure thus generated in the chamber 5 is directly delivered to the rear wheel cylinders, and the rear wheel brake liquid pressure increases as shown by a line a-b-c' of FIG. 4, so that any shortage in the brake force during the loss of the front wheel brake system can be removed.

In the example described above, the annular projection 4a integrally formed on the secondary piston 4 is used for turning the valve-opening rod 29, but any other actuating means moving together with the secondary piston 4 is sufficient for this purpose, and such actuating means is not required to be integrally formed with the secondary piston 4.

Figure 3:
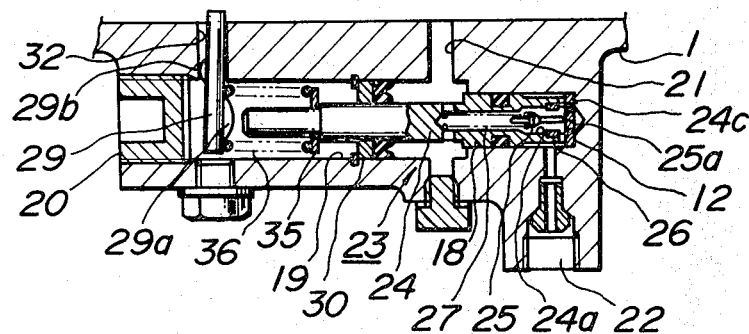
FIG. 3 is a partial sectional view of an essential portion of a different embodiment of the tandem master cylinder with a liquid pressure control valve according to the present invention.

FIG. 3 shows an essential portion of another embodiment of the tandem master cylinder with a liquid pressure control valve according to the present invention. In the embodiment of the figure, a spring seat 35 is mounted on a plunger 24, and a compressed spring 36 is inserted between a valve-opening rod 29 and the valve seat 35. Except the arrangement of the valve seat 35 and the spring 36, the embodiment of FIG. 3 has the same construction as that of FIG. 1. With the embodiment of FIG. 3, the spring 36 fulfills the functions of both the spring 28 and the spring 33 of the embodiment of FIG. 1, for fulfilling the entire functions of the master cylinder, while reducing the number of parts. Thus, the embodiment of FIG. 3 allows a cost reduction of the tandem master cylinder with a liquid pressure control valve according to the present invention.

As described in the foregoing, with the tandem master cylinder according to the present invention, a liquid pressure control valve is incorporated within the tandem master cylinder, and a separate piping of the prior art for connecting the liquid pressure control valve to a rear wheel brake system can be dispensed with. As a result, various advantages have been achieved: namely, the number of parts is reduced, the piping work is simplified, the consideration for a mounting space of a separate liquid pressure control valve is not necessary, and the freedom in automobile design is enhanced.

Besides, in the present invention, a proportioning valve is used as a liquid pressure control valve and a plunger of the liquid pressure control valve is so arranged that, in case of a loss of front wheel brake system, the plunger responds to movement of a secondary piston, whereby construction of a regular proportioning valve itself can be used without necessitating any special liquid control valve.

What is claimed is:

1. A tandem master cylinder with a liquid pressure control valve, comprising a cylinder body having a cylinder hole and an outlet port for rear wheel brake liquid pressure; a primary piston and a secondary piston disposed in said cylinder hole of said cylinder body, said primary piston adapted to generate a rear wheel brake liquid pressure in response to depression of a brake pedal, and said secondary piston adapted to respond to movement of said primary piston so as to generate a front wheel brake liquid pressure; a liquid pressure control valve disposed in said cylinder body between said cylinder hole and said outlet port for rear wheel brake liquid pressure, said liquid pressure control valve including means for making a rate of increase of said rear brake liquid pressure smaller than that of said front wheel brake liquid pressure by selectively closing a liquid passage from said cylinder hole to said outlet port; and means, responsive to an excessively large stroke of said secondary piston at a loss of front brake system, for keeping said liquid pressure control valve at an open position thereof for opening said liquid passage to increase the rear wheel brake liquid pressure to overcome the loss of front brake system, said keeping open means including:

a plunger in said liquid pressure control valve which plunger is movable between an open position permitting liquid flow between said cylinder hole and said outlet port and a closed position blocking flow between said cylinder hole and said outlet port, and means by which the excess stroke of said secondary piston causes said plunger to be in said open position, said causing means comprising a valve-opening rod engaging a projection of said secondary piston during said excess stroke of said secondary piston and being pivotally movable to cause said plunger of said liquid pressure control valve to move into its open position.

* * * * *